(12) United States Patent
Moniwa et al.

(10) Patent No.: US 8,142,650 B2
(45) Date of Patent: Mar. 27, 2012

(54) WATER TREATMENT SYSTEM

(75) Inventors: Shinobu Moniwa, Kawasaki (JP); Hidetake Shiire, Tokyo (JP); Satomi Ebihara, Fuchu (JP); Nobuyuki Ashikaga, Kawasaki (JP); Tomoaki Kiuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 12/539,384

(22) Filed: Aug. 11, 2009

(65) Prior Publication Data

US 2010/0059444 A1 Mar. 11, 2010

(30) Foreign Application Priority Data

Sep. 11, 2008 (JP) .............................. P2008-233740

(51) Int. Cl.
*B01D 35/06* (2006.01)

(52) U.S. Cl. ....... 210/96.1; 210/175; 210/223; 210/266; 210/269; 210/282; 210/289; 210/502.1; 210/512.1

(58) Field of Classification Search .................. 210/175, 210/222, 223, 259, 269, 502.1, 661, 691–693, 210/695, 671, 675, 96.1, 266, 282, 289, 512.1
See application file for complete search history.

(56) References Cited

U.S. PATENT DOCUMENTS

| | | | | |
|---|---|---|---|---|
| 3,478,873 A | * | 11/1969 | McLean | 210/671 |
| 3,767,571 A | * | 10/1973 | Lorenc et al. | 210/671 |
| 3,890,224 A | * | 6/1975 | Weiss et al. | 210/671 |
| 4,937,001 A | * | 6/1990 | Bellows | 210/661 |
| 5,244,580 A | * | 9/1993 | Li | 210/666 |
| 5,409,813 A | * | 4/1995 | Schwartz | 435/7.24 |
| 2009/0277843 A1 | | 11/2009 | Fukaya et al. | |
| 2009/0314717 A1 | | 12/2009 | Fujieda et al. | |
| 2009/0321363 A1 | | 12/2009 | Murai et al. | |
| 2010/0059448 A1 | | 3/2010 | Fujieda et al. | |

FOREIGN PATENT DOCUMENTS

| | | | | |
|---|---|---|---|---|
| JP | 59222207 A | * | 12/1984 | ............ 210/695 |
| JP | 60-112390 | | 7/1985 | |
| JP | 2000-176306 | | 6/2000 | |
| JP | 2004-181342 | | 7/2004 | |
| JP | 2004-305927 | | 11/2004 | |
| JP | 2005-177532 | | 7/2005 | |
| JP | 2005-238006 | | 9/2005 | |

OTHER PUBLICATIONS

Notification of Reasons for Rejection issued by the Japanese Patent Office on Jul. 20, 2010, for Japanese Patent Application No. 2008-233740, and English-language abstract thereof.
Notification of Reasons for Rejection issued by the Japanese Patent Office on Oct. 5, 2010, for Japanese Patent Application No. 2008-233740, and English-language abstract thereof.
Notification of First Examination Comment mailed Jul. 20, 2011, from the State Intellectual Property Office of the People's Republic of China in corresponding Chinese Application No. 200910167001. 4, and English abstract thereof. (6 pages).

* cited by examiner

*Primary Examiner* — Matthew Savage
(74) *Attorney, Agent, or Firm* — Finnegan, Henderson, Farabow, Garrett & Dunner, L.L.P.

(57) ABSTRACT

A water treatment system comprises: an oil removal apparatus including a fixed-bed reactor configured to hold an adsorption particles by use of a magnetic unit, the adsorption particles each including a base material containing magnetite, the adsorption particles configured to adsorb oil included in to-be-treated water; a pretreatment apparatus configured to recover the oil from the adsorption particles sent from the oil removal apparatus; and a thermal energy generating apparatus configured to obtain thermal energy from the oil recovered by the pretreatment apparatus.

12 Claims, 9 Drawing Sheets

WATER TREATMENT SYSTEM

CROSS REFERENCE TO RELATED APPLICATIONS AND INCORPORATION BY REFERENCE

This application is based upon and claims the benefit of priority from prior Japanese Patent Application No. P2008-233740 filed on Sep. 11, 2008; the entire contents of which are incorporated by reference herein.

TECHNICAL FIELD

The present invention relates to a water treatment system configured to treat water to be treated, which includes oil, and is effluent from a factory or the like.

BACKGROUND ART

Oil is included in industrial wastewater effluent from an industrial society system such as a food plant. This oil is subjected to: a flocculation treatment using a flocculation agent that contains iron, aluminum salt, and the like; or a floatation treatment utilizing the adhesion properties of the oil to fine air bubbles. Through these treatments, the oil is disposed of as an industrial waste in the form of oil-containing polluted sludge. From the viewpoint of the necessity of reducing the generation of polluted sludge and selectively oil removal needs from industrial wastewater, technologies for oil removal by use of an oil adsorbent have been proposed as water treatment systems configured to treat water including oil, in addition to the above-mentioned oil removal technologies.

For selective removal of oil, Patent Document 1 proposes a technology of oil removal from water to be treated (hereinafter referred to as "to-be-treated water") by bringing the to-be-treated water into contact with an oil-water separation medium whose surface properties have a high affinity with oil. Patent Document 1 further proposes a technology in which: air bubbles are introduced into the oil-water separation medium having adsorbed the oil; thereby, the oil is removed from to-be-treated water; and thus, the oil-water separation medium is recovered.

Patent Document 2 proposes: an oil removal method using a magnetic substance for adsorbing oil which floats on the surface of water; and a method of recovering the magnetic substance by use of a magnetic force. This technology may be used as a method of recovering oil in a water treatment operation conducted in a large area, such as a sea.

Patent Document 3 discloses a technology in which: oil is adsorbed to hydrophobic-surface particles each having a magnetic substance as its core material; and thereafter the hydrophobic-surface particles are flocculated by use of a flocculation agent. According to the technology disclosed in Patent Document 3, the adsorbent is thereafter reused through the regeneration of the adsorbent by use of a solvent, or in the form of burning the adsorbent.

CITATION LIST

Patent Literature

Patent Literature 1: Japanese Patent Laid-Open Publication No. 2004-305927
Patent Literature 2: Japanese Patent Laid-Open Publication No. 2000-176306
Patent Literature 3: Japanese Patent Laid-Open Publication No. 2005-177532

SUMMARY OF INVENTION

Technical Problem

However, the oil removed in the technologies disclosed in Patent Documents 1 to 3 is disposed of as polluted sludge, and thus is not recovered and reused.

Solution to Problem

For solving the problem, an object of the present invention is to provide a water treatment system which purifies water, and concurrently reuses oil that would be disposed of by the conventional water treatment system.

According to an aspect of the present invention, a water treatment system comprises: an oil removal apparatus including a fixed-bed reactor configured to hold an adsorption particles by use of a magnetic unit, the adsorption particles each including a base material containing magnetite, the adsorption particles configured to adsorb oil included in to-be-treated water; a pretreatment apparatus configured to recover the oil from the adsorption particles sent from the oil removal apparatus; and a thermal energy generating apparatus configured to obtain thermal energy from the oil recovered by the pretreatment apparatus.

The water treatment system according to the present invention may further comprises an adsorption particle regenerating apparatus configured to regenerate the adsorption particles from which the oil is removed by the pretreatment apparatus.

In the water treatment system according to the present invention, the adsorption particle regenerating apparatus supplies the regenerated adsorption particles to the oil removal apparatus.

In the water treatment system according to the present invention, the pretreatment apparatus is any one of an organic solvent extracting apparatus, a steam cleaning apparatus and a supercritical carbon dioxide extracting apparatus.

In the water treatment system according to the present invention, a plurality of the oil removal apparatuses are provided.

In the water treatment system according to the present invention, the oil removal apparatus includes: a measurement unit configured to measure an amount of oil included in the water having been treated for oil removal; and valves each configured to be opened and closed on the basis of the amount of the oil which is measured by the measurement unit.

In the water treatment system according to the present invention, the magnetic unit is an electromagnet, and a magnetic force controller configured to electrically control the magnetic unit is provided in order to hold or be discharged the adsorption particles.

In the water treatment system according to the present invention, the magnetic unit is a permanent magnet, and the permanent magnet is movable between a position which enables the permanent magnet to hold the adsorption particles and a position which enables the permanent magnet to be discharged the adsorption particles.

The water treatment system according to the present invention may further comprises a fluidized bed reactor configured to agitate together the adsorption particles and the to-be-treated water, the fluidized bed reactor provided in an area supplied with the to-be-treated water; and an adsorption particle supplying unit configured to supply the adsorption particles to the fluidized bed reactor.

The water treatment system according to the present invention may further comprises a cyclone provided in a lower portion of the oil removal apparatus.

In the water treatment system according to the present invention, the fixed-bed reactor includes a holding net with meshes each of which is smaller than each of the adsorption particles.

In the water treatment system according to the present invention, the holding net is removable, and the holding net is removed and transported to the pretreatment apparatus, together with the adsorption particles.

Advantageous Effects of Invention

The present invention enables oil to be recovered from adsorption particles by use of a pretreatment apparatus, and thus to purify water and to be reused.

DESCRIPTION OF EMBODIMENTS

Embodiments

First Embodiment

Figure 1:
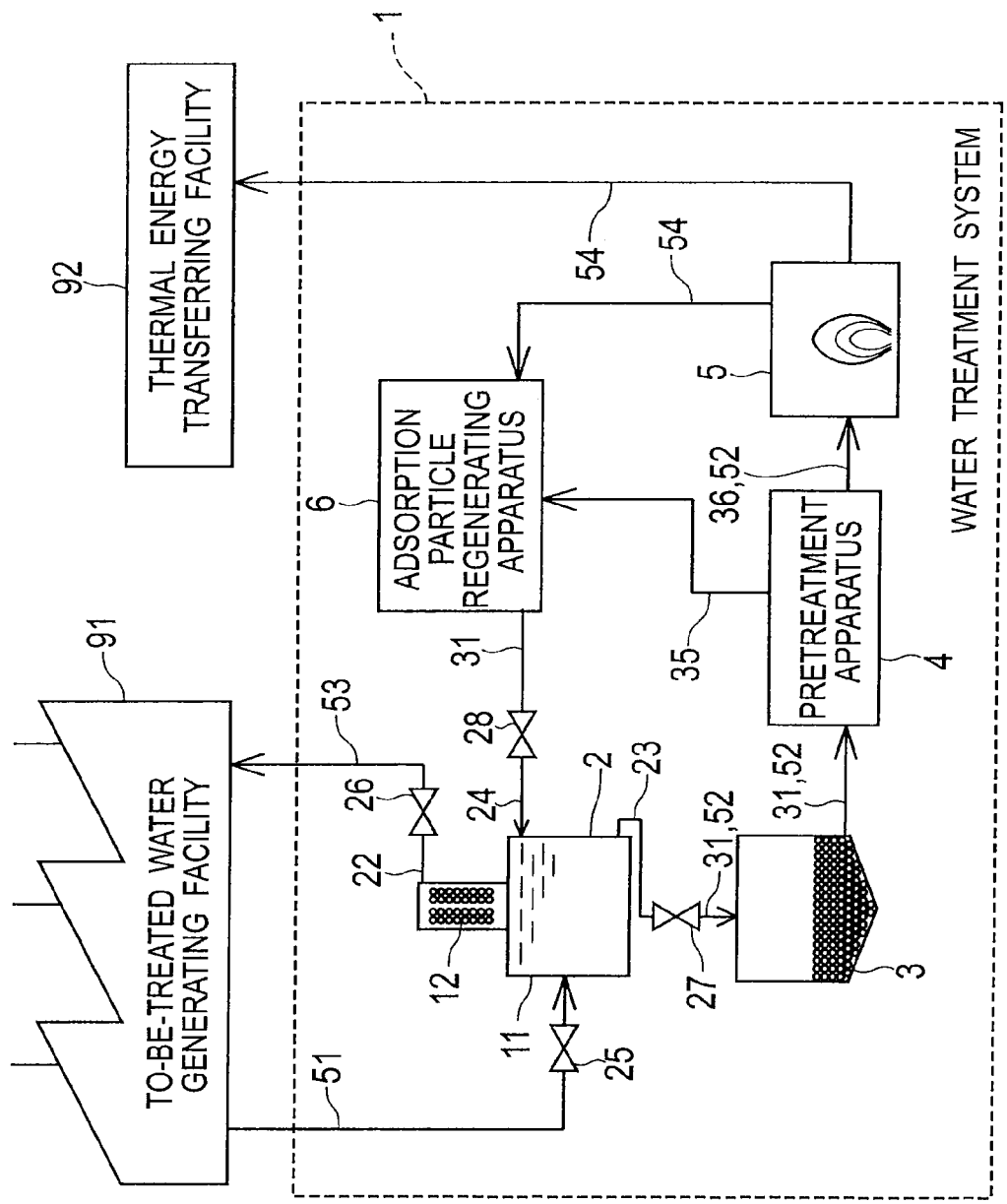
FIG. 1 is a drawing of an overall configuration of a water treatment system according to a first embodiment.
Figure 2:
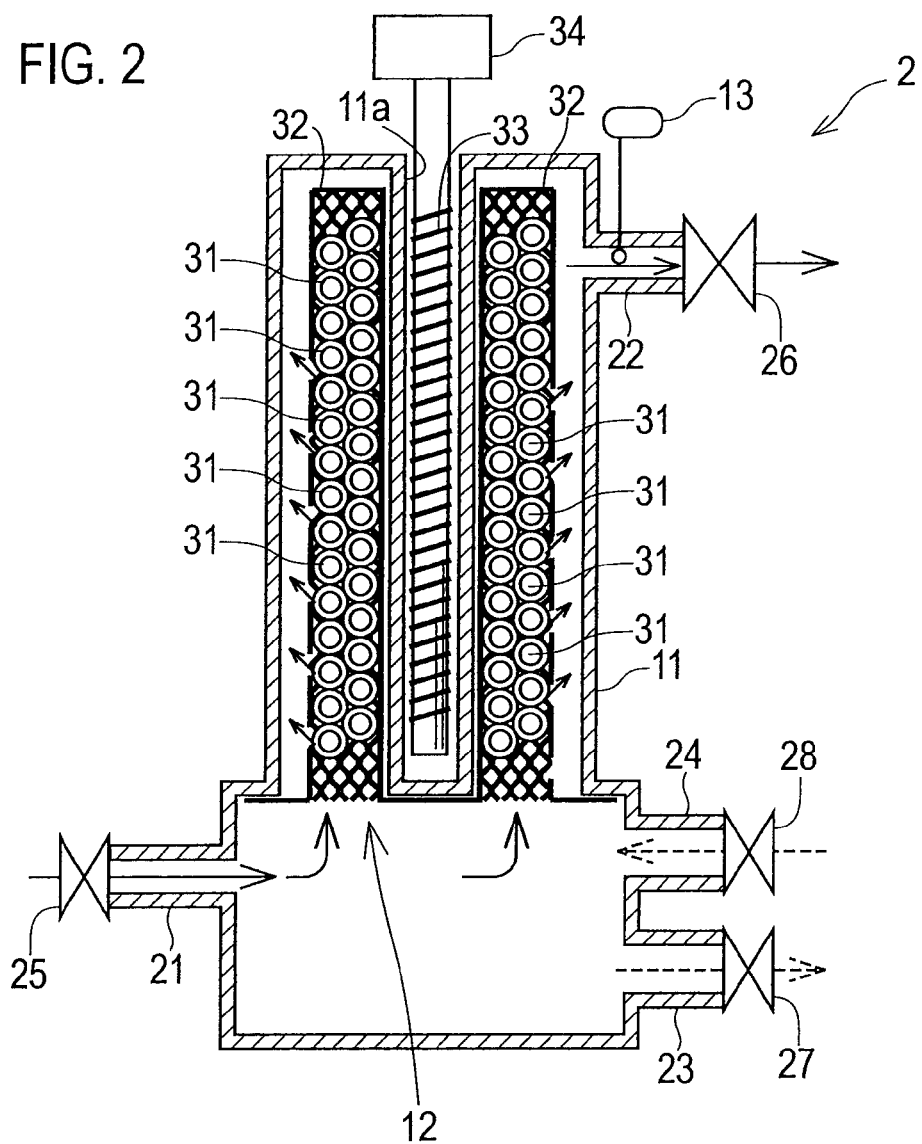
FIG. 2 is an overall cross-sectional view of an oil removal apparatus.
Figure 3:
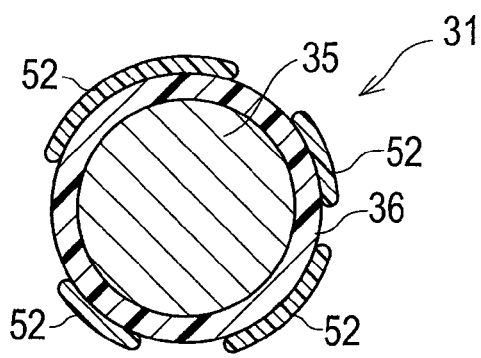
FIG. 3 is a cross-sectional view of an adsorption particle.

Referring to the drawings, descriptions will be provided for a first embodiment of the present invention. FIG. 1 is a drawing showing an overall configuration of a water treatment system according to the first embodiment. FIG. 2 is a diagram showing an overall configuration of an oil removal apparatus. FIG. 3 is a cross-sectional diagram of an adsorption particle.

As shown in FIG. 1, the water treatment system 1 according to the first embodiment recovers oil 52 from to-be-treated water 51 which is effluent from a to-be-treated water generating facility 91, and then supplies thermal energy 54 to a thermal energy transferring facility 92.

The water treatment system 1 includes an oil removal apparatus 2, an adsorption particle container 3, a pretreatment apparatus 4, a thermal energy generating apparatus 5, and an adsorption particle regenerating apparatus 6.

The oil removal apparatus 2 is configured to remove the oil 52 from the to-be-treated water 51, and thereby to separate the to-be-treated water 51 into the oil 52 and treated water 53. As shown in FIG. 2, the oil removal apparatus 2 includes a main body 11, a fixed-bed reactor 12 and a sensor (an equivalent of a measuring unit in a claim) 13.

The main body 11 is configured to house the fixed-bed reactor 12. The main body 11 includes a water inlet 21, a water outlet 22, a effluent port 23 and a supply port 24. The water inlet 21 is configured to supply the to-be-treated water 51 which has been effluent from the to-be-treated water generating facility 91 via a valve 25. The water outlet 22 drains the treated water 53 resulting from removing the oil 52 from the to-be-treated water 51. The water outlet 22 is connected to the to-be-treated water generating facility 91 through a valve 26. The effluent port 23 is configured to be effluent adsorption particles 31 which have adsorbed the oil 52. The effluent port 23 is connected to the adsorption particle container 3 through a valve 27. The supply port 24 is configured to supply the main body 11 with adsorption particles 31 which has been regenerated. The supply port 24 is connected to the adsorption particle regenerating apparatus 6 through a valve 28. In a center portion of the main body 11, a concave part 11a is formed into which an electromagnet 33 to be described later is inserted.

The fixed-bed reactor 12 includes the adsorption particles 31, a holding net 32, the electromagnet 33 and a magnetic force controller 34.

The adsorption particles 31 are configured to adsorb the oil 52 which is included in the to-be-treated water 51. As shown in FIG. 3, each adsorption particle 31 includes a base material 35 and adsorbent 36. The base material 35 contains magnetite, iron, cobalt, nickel or the like which possesses magnetic properties. The base material 35 is shaped like a particle such as a sphere. The adsorbent 36 is made of a material capable of adsorbing the oil 52. Specifically, the adsorbent 36 is made of, for example, a polyolefin resin, such as polypropylene which is hydrophobic and also lipophilic. The surface of the base material 35 is coated with the adsorbent 36. Incidentally, a granulated material of fine particles may be used instead of the adsorbent 36 as long as the granulating material possesses oil-permeable pores.

The holding net 32 is configured to restrain the adsorption particles 31 from being discharged through the water outlet 22, in corporation with the treated water 53. To this end, the roughness of each mesh of the holding net 32 is set finer than the size of each adsorption particle 31. The holding net 32 is placed inside the main body 11, and specifically, around the outer peripheral portion of the concave part 11a.

The electromagnet 33 is configured to magnetically hold the adsorption particles 31 around the concave part 11a of the main body 11 in which the treated water 51 flows. The electromagnet 33 is configured to restrain the adsorption particles 31 from flowing out through the water outlet 22, in cooperation with the holding net 32. The electromagnet 33 is formed to extend in a vertical direction. The electromagnet 33 is inserted in the concave part 11a. While the adsorption particles 31 are adsorbing the oil 52 from the to-be-treated water 51, the electromagnet 33 magnetically holds the adsorption particles 31 around the concave part 11a. When the adsorption particles 31 are discharged through the effluent port 23, the electromagnet 33 loses its magnetic force, and thus releases the adsorption particles 31 from their retention.

The magnetic force controller 34 controls an electric current supplied to the electromagnet 33, and thus controls the magnetic force produced by the electromagnet 33. Thereby, the magnetic force controller 34 controls the retention of the adsorption particles 31 and the release of the adsorption particles 31 from their retention by the electromagnet 33.

The sensor 13 is configured to measure the concentration of the oil 52 included in the treated water 53 which is effluent through the water outlet 22 after the oil 52 is removed from the to-be-treated water 51. On the basis of the content of the oil 52 in the treated water 53 that is measured by the sensor 13, each of the valves 25, 26, 27, 28 is opened and closed.

The adsorption particle container 3 is configured to temporarily contain adsorption particles 31 which have lost their adsorption functions after adsorbing the oil 52. The adsorption particle container 3 is supplied with the adsorption particles 31 from the effluent port 23 of the oil removal apparatus 2. The adsorption particle container 3 includes a pump (whose illustration is omitted) configured to suck the adsorption particles 31. In addition, the adsorption particle container 3 supplies the adsorption particles 31 to the pretreatment apparatus 4. Note that the adsorption particle container 3 may supply the adsorption particles 31 to the pretreatment apparatus 4 intermittently or continuously.

The pretreatment apparatus 4 is an organic solvent extracting apparatus configured to desorb the oil 52 from the adsorption particles 31 which have adsorbed the oil 52, and thus to recover the oil 52. The pretreatment apparatus 4 removes the oil 52 from the base materials 35 by a rinsing process using an alcohol such as ethanol. In this respect, together with the oil 52, the adsorbent 36 of each adsorption particle 31 is removed from the corresponding base material 35. The rinsing process may be carried out by use of saturated hydrocarbon, supercritical carbon dioxide which is liquefied carbon dioxide under high pressure, a burnable medium such as steam, or a medium capable of being easily separated from recovered oil, instead of by use of the alcohol. By use of a solid-liquid separator (whose illustration is omitted), the pretreatment apparatus 4 separates the oil 52, the alcohol and the adsorbent 36 which are all liquids from the base material 35 which is a solid. The separated oil 52 together with the adsorbent 36 and the alcohol is supplied to the thermal energy generating apparatus 5 by the pretreatment apparatus 4. In addition, each base material 35 is supplied to the adsorption particle regenerating apparatus 6 by the pretreatment apparatus 4.

The thermal energy generating apparatus 5 is configured to burn the oil 52 and the like which have been supplied from the pretreatment apparatus 4, and thus obtains thermal energy 54. The thermal energy generating apparatus 5 is an inner combustion engine. The thermal energy generating apparatus 5 may be supplied with another fuel in addition to the oil 52 supplied from the pretreatment apparatus 4. Instead, the thermal energy generating apparatus 5 may be configured in a way that heat is generated from the oil 52 by using the oil 52 as a feedstock for a steam reforming apparatus, or in a way that heat is generated from the oil 52 by a thermal decomposition apparatus, a biological fermentation reactor or the like. The thermal energy generating apparatus 5 supplies the thus-obtained thermal energy 54 to the thermal energy transferring facility 92 and the adsorption particle regenerating apparatus 6.

The adsorption particle regenerating apparatus 6 is configured to regenerate each base material 35, which has been supplied from the pretreatment apparatus 4, as an adsorption particle 31. The adsorption particle regenerating apparatus 6 is configured by including a spray dryer. The adsorption particle regenerating apparatus 6 coats the surface of each base material 35 with the adsorbent 36. The adsorption particle regenerating apparatus 6 regenerates the adsorption particles 31 by use of the thermal energy 54 supplied thereto from the thermal energy generating apparatus 5.

Figure 4:
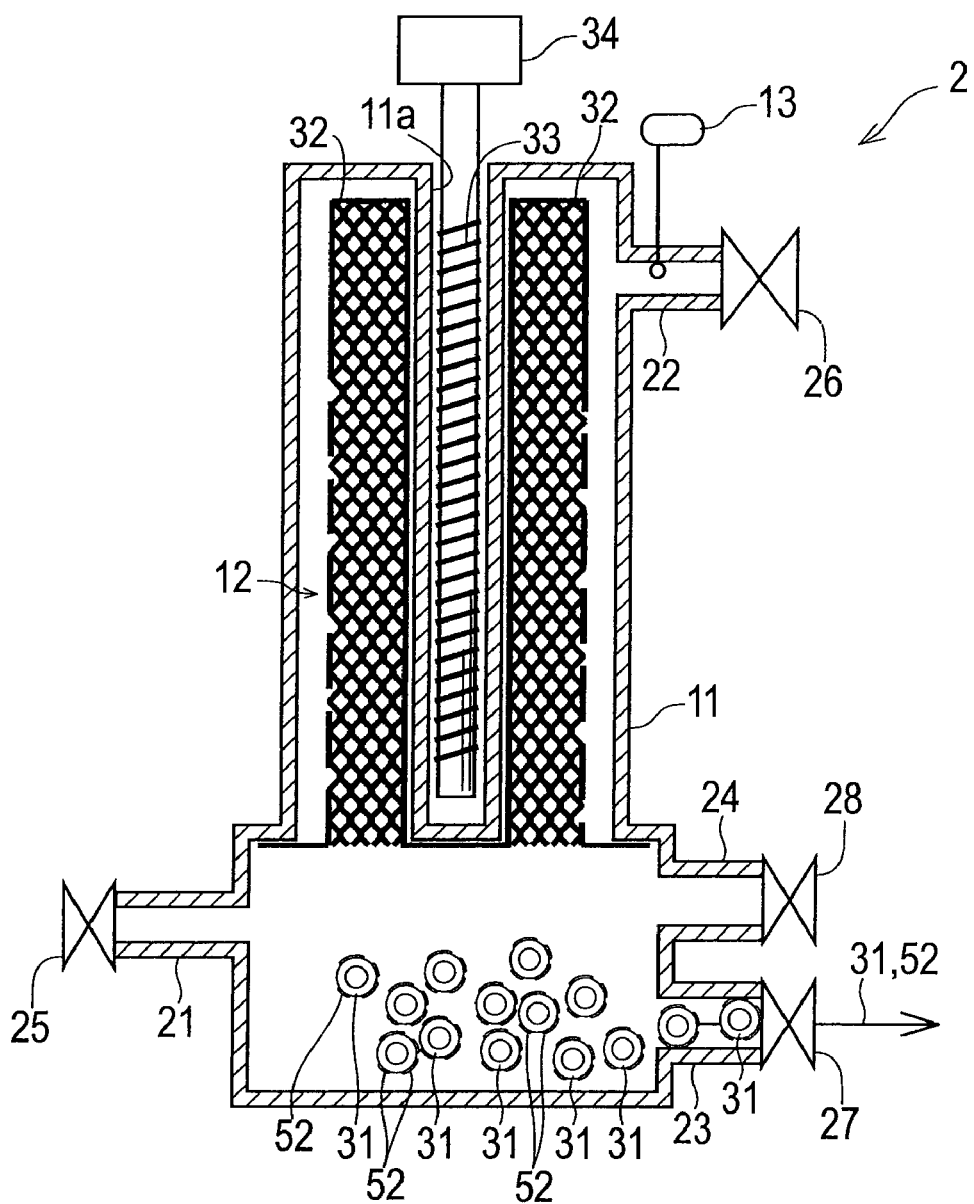
FIG. 4 is a diagram to explain how the oil removal apparatus operates.
Figure 5:
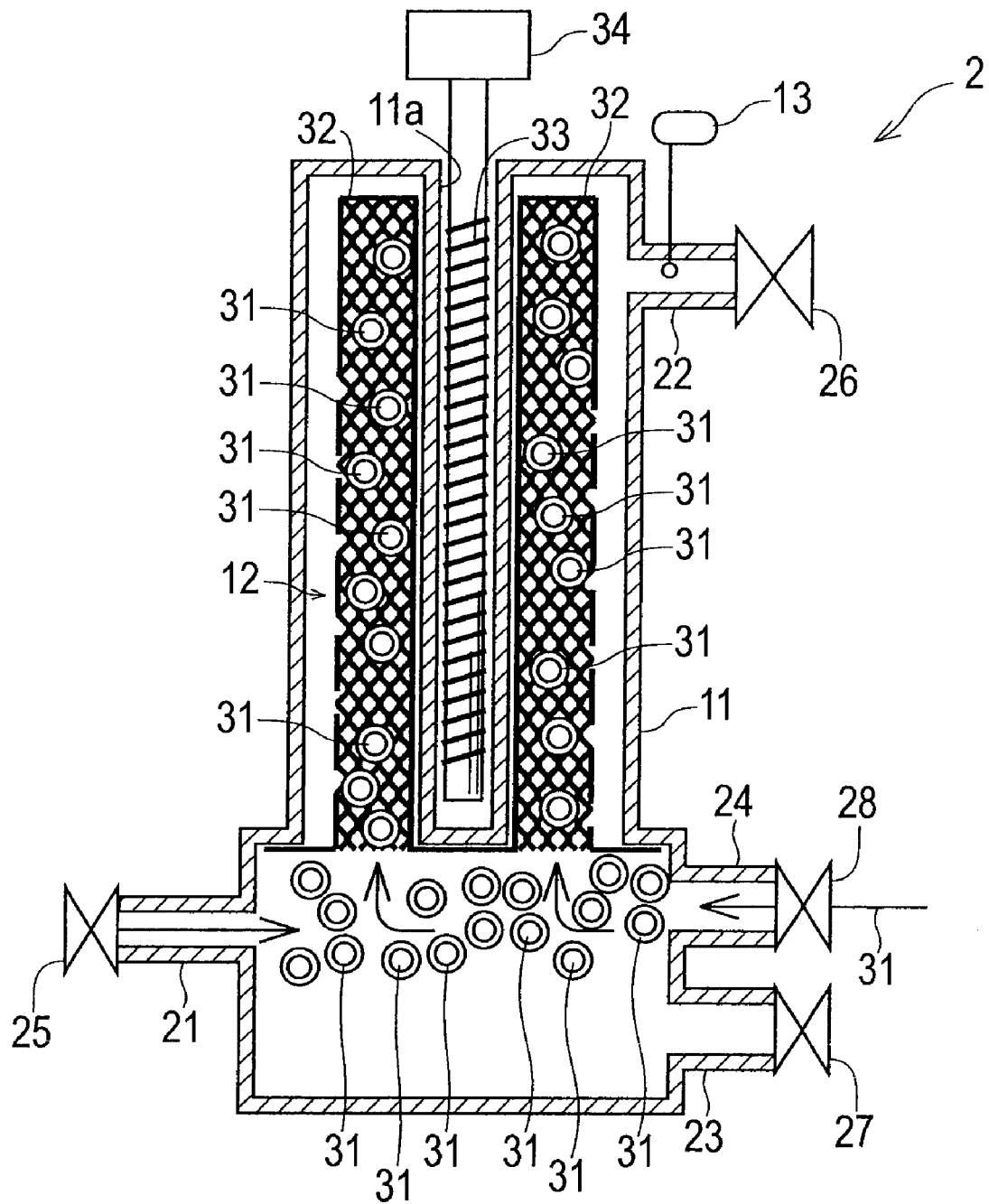
FIG. 5 is another diagram to explain how the oil removal apparatus operates.

Next, descriptions will be provided for a flow of the water treatment carried out by the above-described water treatment system 1 of the first embodiment. The descriptions will be provided referring to the related drawings. FIG. 4 is a diagram to explain how the oil removal apparatus operates. FIG. 5 is another diagram to explain how the oil removal apparatus operates.

First of all, when the water inlet 21 is opened, the to-be-treated water 51 which contains the oil 52 is supplied to the oil removal apparatus 2 from the to-be-treated generating facility 91 such as a plant.

At this time, in the oil removal apparatus 2, the magnetic force controller 34 supplies an electric current to the electromagnet 33. Thereby, the adsorption particles 31 are held in the inside of the holding net 32 placed around the outer peripheral portion of the concave 11a in the main body 11. Here, the valve 25 of the water outlet 22 is opened, whereas the valve 27 of the effluent port 23 and the valve 28 of the supply port 24 are closed. Consequently, the to-be-treated water 51 flows around the adsorption particles 31 held in the inside of the holding net 32. As a result, the oil 52 contained in the to-be-treated water 51 is adsorbed to the adsorbents 36 of the respective adsorption particles 31. Thereby, the to-be-treated water 51 from which the oil 52 is removed is turned into the treated water 53. The treated water 53 is drained through the water outlet 22. The treated water 53 drained through the water outlet 22 is sent to and reused in the to-be-treated water generating facility 91. The to-be-treated water 51 continues being treated until the adsorption particles 31 lose their function of adsorbing the oil 52.

As the function of the adsorption particles 31 to adsorb the oil 52 decreases, the content of the oil 52 included in the treated water 53 increases. When the increase is detected by the sensor 13, the magnetic force controller 34 stops its supply of the electric power to the electromagnet 33. In addition, the valve 25 of the water inlet 21 and the valve 26 of the water outlet 22 are closed, whereas the valve 27 of the effluent port 23 is opened. Thereby, as shown in FIG. 4, the electromagnet 33 releases the adsorption particles 31 from their retention, and the adsorption particles 31 accordingly fall onto the lower portion of the main body 11. Thereafter, the adsorption particles 31 are discharged through the effluent port 23. After being temporarily contained in the adsorption particle container 3, the adsorption particles 31 are supplied to the pretreatment apparatus 4.

In the pretreatment apparatus 4, the adsorption particles 31 are rinsed with the alcohol. Thereby, the oil 52 adsorbed to each adsorption particle 31 as well as the adsorbent 36 of the adsorption particle 31 are removed from the corresponding base material 35. Thereafter, the alcohol, the adsorbent 36 and the oil 52 are separated from the base materials 35 by the solid-liquid separator (whose illustration is omitted).

Afterward, the separated oil 52 together with the separated adsorbent 36 and the separated alcohol is supplied from the pretreatment apparatus 4 to the thermal energy generating apparatus 5. The thermal energy generating apparatus 5 burns the oil 52, and converts the oil 52 to the thermal energy 54. Part of this thermal energy 54 is supplied to the adsorption particle regenerating apparatus 6, whereas the rest of the thermal energy 54 is supplied to the thermal energy receiving apparatus 92.

On the other hand, the separated base materials 35 are sent from the pretreatment apparatus 4 to the adsorption particle regenerating apparatus 6. The base materials 35 are coated with the adsorbent 36 by the adsorption particle regenerating apparatus 6, and are thus regenerated as the adsorption particles 31. When coating the base materials 35 with the adsorbent 36, the adsorption particle regenerating apparatus 6 uses the thermal energy 54 which is supplied from the thermal energy generating apparatus 5.

After that, as shown in FIG. 5, the oil removal apparatus 2 closes the valve 27, and opens the valve 28. In addition, the oil removal apparatus 2 causes the magnetic force controller 34 to supply an electric current to the electromagnet 33, and thus causes the electromagnet 33 to produce the magnetic force. While the oil removal apparatus 2 is in this condition, the regenerated adsorption particles 31 are supplied to the oil removal apparatus 2 through the supply port 24. Here, because the electromagnet 33 is exerting the magnetic force, the supplied adsorption particles 31 are held by the holding net 32 placed around the outer periphery of the electromagnet 33.

Thereafter, the to-be-treated water 51 is supplied to the oil removal apparatus 2, and the above-described water treatment is repeated.

As described above, the water treatment system 1 according to the first embodiment is capable of causing the pretreatment apparatus 4 to recover the oil 52 which has been adsorbed to the adsorption particles 31 by the oil removal apparatus 2. Thereby, the thermal energy generating apparatus 5 can reuse the recovered oil 52, and thus generate the thermal energy. Consequently, the water treatment system 1 is capable of enhancing its energy efficiency. Moreover, since the oil 52 no longer needs to be disposed of as industrial waste, the water treatment system 1 is capable of improving the water quality, and of reducing the generation amount of polluted sludge to be disposed of.

Here, the main raw material of the oil 52 included in the to-be-treated water 51 is a fossil fuel when the oil 52 is a mineral oil, whereas the main raw material of the oil 52 included in the to-be-treated water 51 is grain when the oil 52 is a vegetable oil. Japan depends on its import for the supply of most of these main raw materials. Currently, the oil 52 included in the to-be-treated water 51 is disposed as polluted sludge in Japan. On the contrary, the water treatment system 1 reuses the oil 52 included in the to-be-treated water 51. Thereby, the water treatment system 1 is capable of increasing the overall utilization ratio of imported carbon source in Japan and abroad. Consequently, the water treatment system 1 is capable of reducing the amount of effluent carbon dioxide, and also provides advantages in conjunction with environmental cleanup by reusing the energy of the oil 52 included in the to-be-treated water 51.

Furthermore, reusing the treated water 53 obtained by removing the oil 52 from the to-be-treated water 51, the water treatment system 1 is capable of decreasing the amount to fresh water to be used, and reducing water pollution.

In addition, regenerating and reusing the adsorption particles 31, the water treatment system 1 is capable of reducing the costs of the water treatment.

Moreover, the water treatment system 1 holds the adsorption particles 31 by use of the electromagnet 33 and the holding net 32. Thereby, the water treatment system 1 is capable of restraining the adsorption particles 31 from passing through the valve 26, and consequently from being effluent together with the treated water 53. The holding net 32 is effective particularly when the diameters of the adsorption particles 31 become smaller through their use.

Additionally, the water treatment system 1 causes the to-be-treated water 51 to pass the area in which the adsorption particles 31 are held. For this reason, even if the oil 52 is emulsified in the water, the water treatment system 1 is capable of adsorbing and recovering the oil 52.

Furthermore, the water treatment system 1 removes the oil neither by a cyclone nor film filtration process. For this reason, the water treatment system 1 needs no flocculating agent for causing the adsorption particles to aggregate into a large flocculent mass. Consequently, the water treatment system 1 is capable of reducing the costs of the water treatment.

Second Embodiment

Figure 6:
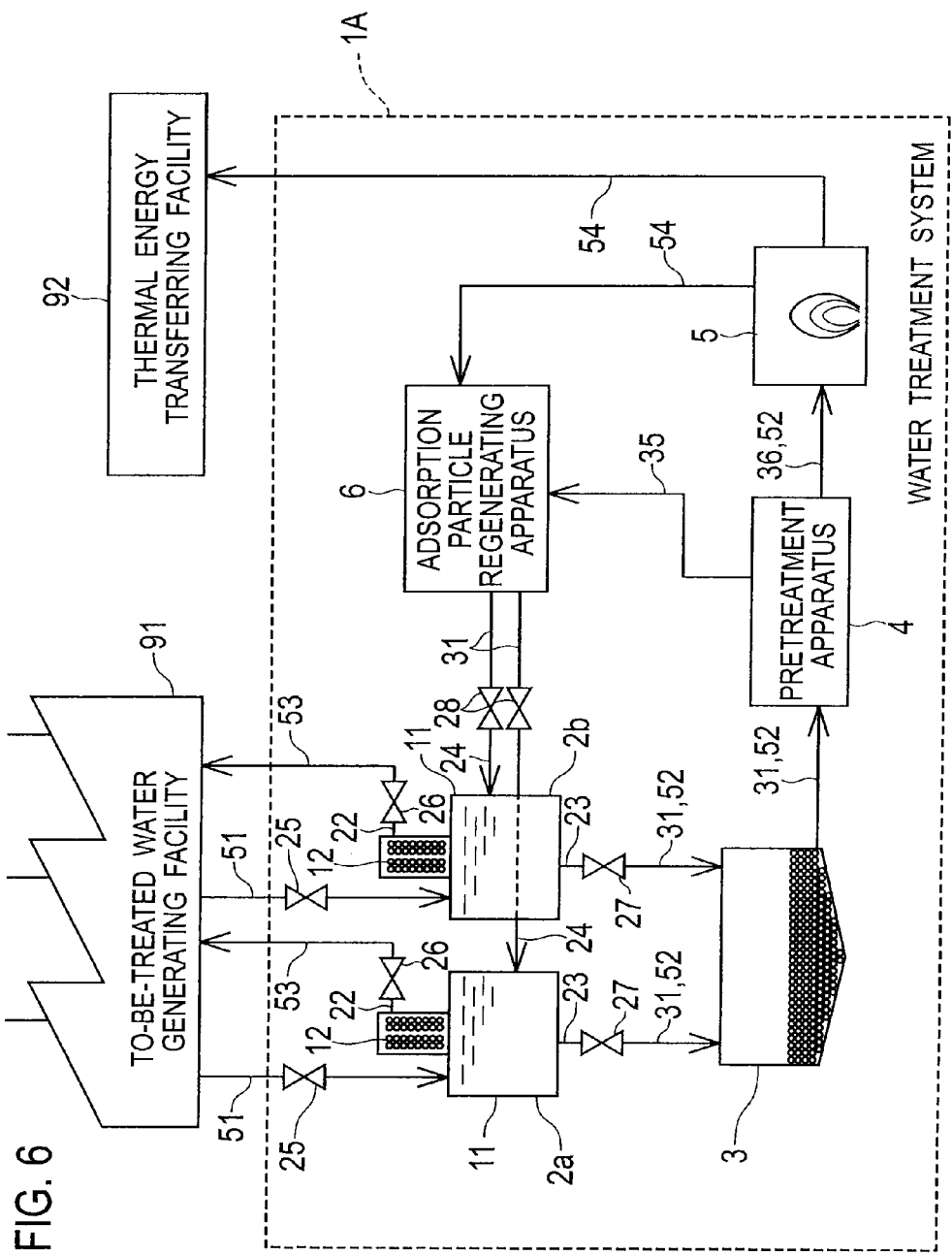
FIG. 6 is a diagram of an overall configuration of a water treatment system according to a second embodiment.

Next, by referring to the drawing, descriptions will be provided for a second embodiment achieved by modifying part of the foregoing embodiment. FIG. 6 is a diagram showing an overall configuration of a water treatment system according to the second embodiment. The same components as those of the foregoing embodiment will be denoted by the same reference signs, and descriptions thereof will be omitted.

As shown in FIG. 6, the water treatment system 1A according to the second embodiment includes two oil removal apparatuses 2a, 2b. Each of the oil removal apparatuses 2a, 2b includes the same configuration as the oil removal apparatus 2 according to the first embodiment includes. The two oil removal apparatuses 2a, 2b are placed in parallel between the to-be-treated water generating facility 91 and the adsorption particle container 3. Thereby, while one oil removal apparatus 2a (2b) is removing the oil 52 from the to-be-treated water 51, the other oil removal apparatus 2b (2a) is capable of discharging the adsorption particles 31 which have been used. Consequently, the water treatment system 1A is capable of continuously treating the to-be-treated water 51 without suspending its treatment operation.

The second embodiment has been described by taking an example where the two oil removal apparatuses 2a, 2b placed in parallel are provided. However, the water treatment system 1A may include three or more oil removal apparatuses placed in parallel. Alternatively, the multiple oil removal apparatuses may be instead placed in series in a case where the amount of the to-be-treated water 51 is large, or where the content of the oil 52 in the to-be-treated water 51 is large.

Third Embodiment

Figure 7:
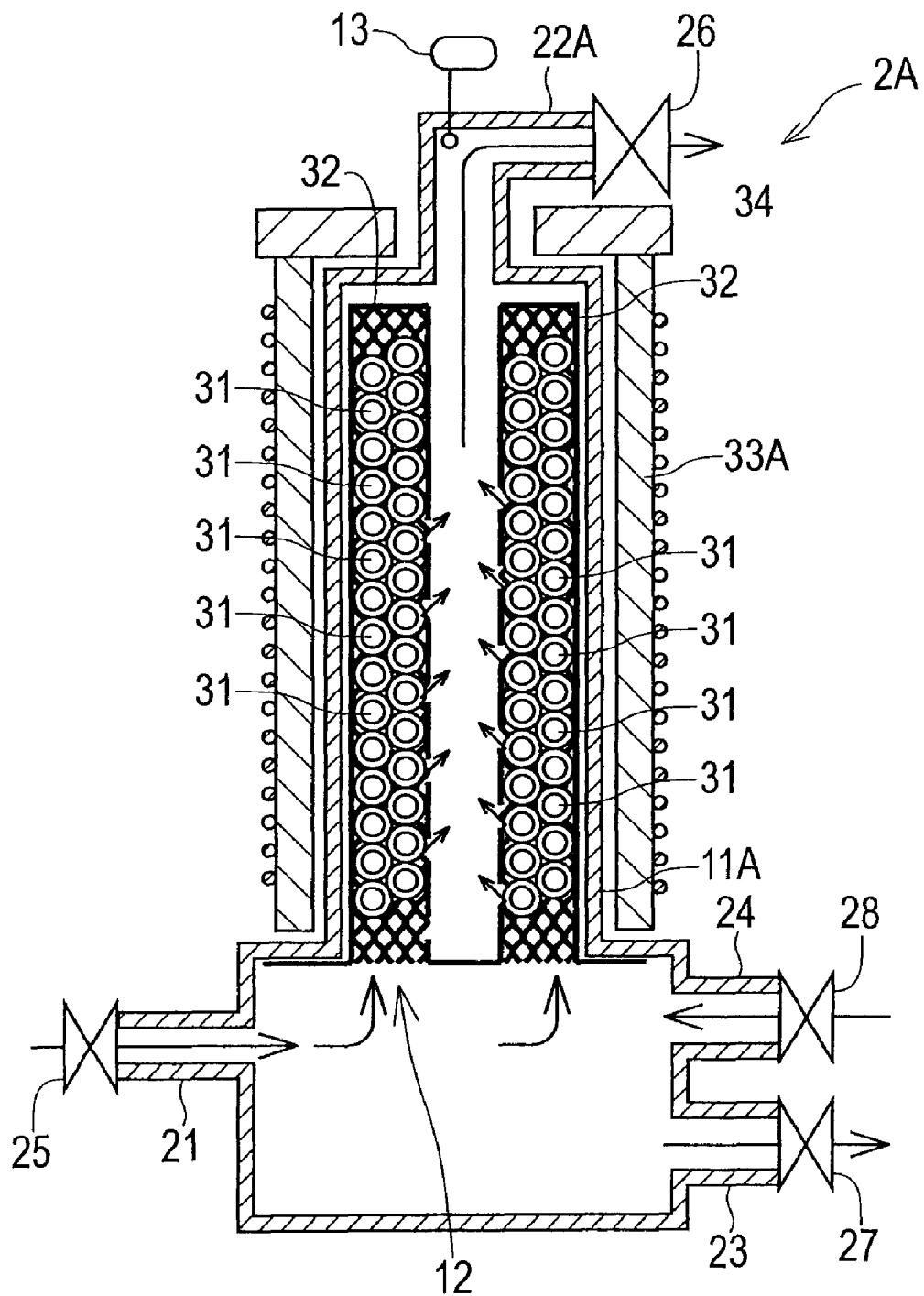
FIG. 7 is an overall cross-sectional view of an oil removal apparatus according to a third embodiment.

Next, by referring to the drawing, descriptions will be provided for a third embodiment achieved by modifying the oil removal apparatuses according the foregoing embodiments. FIG. 7 is an overall cross-sectional view of an oil removal apparatus according to the third embodiment. The same components as those of the foregoing embodiments will be denoted by the same reference signs, and descriptions thereof will be omitted.

As shown in FIG. 7, the oil removal apparatus 2A according to the third embodiment includes an electromagnet 33A placed on the outer periphery of a main body 11A. In addition, the oil removal apparatus 2A includes a water outlet 22A which is placed above a center portion of the main body 11A and which is effluent the treated water 53 to the to-be-treated water generating facility 91.

The provision of the electromagnet 33A on the outer peripheral portion of the oil removal apparatus 2A according to the third embodiment facilitates the installation of the electromagnet 33A, even if the electromagnet 33A is large in size. Thereby, the oil removal apparatus 2A is capable of causing the electromagnet 33A to securely hold the adsorption particles 31 by its magnetic force.

Fourth Embodiment

Figure 8:
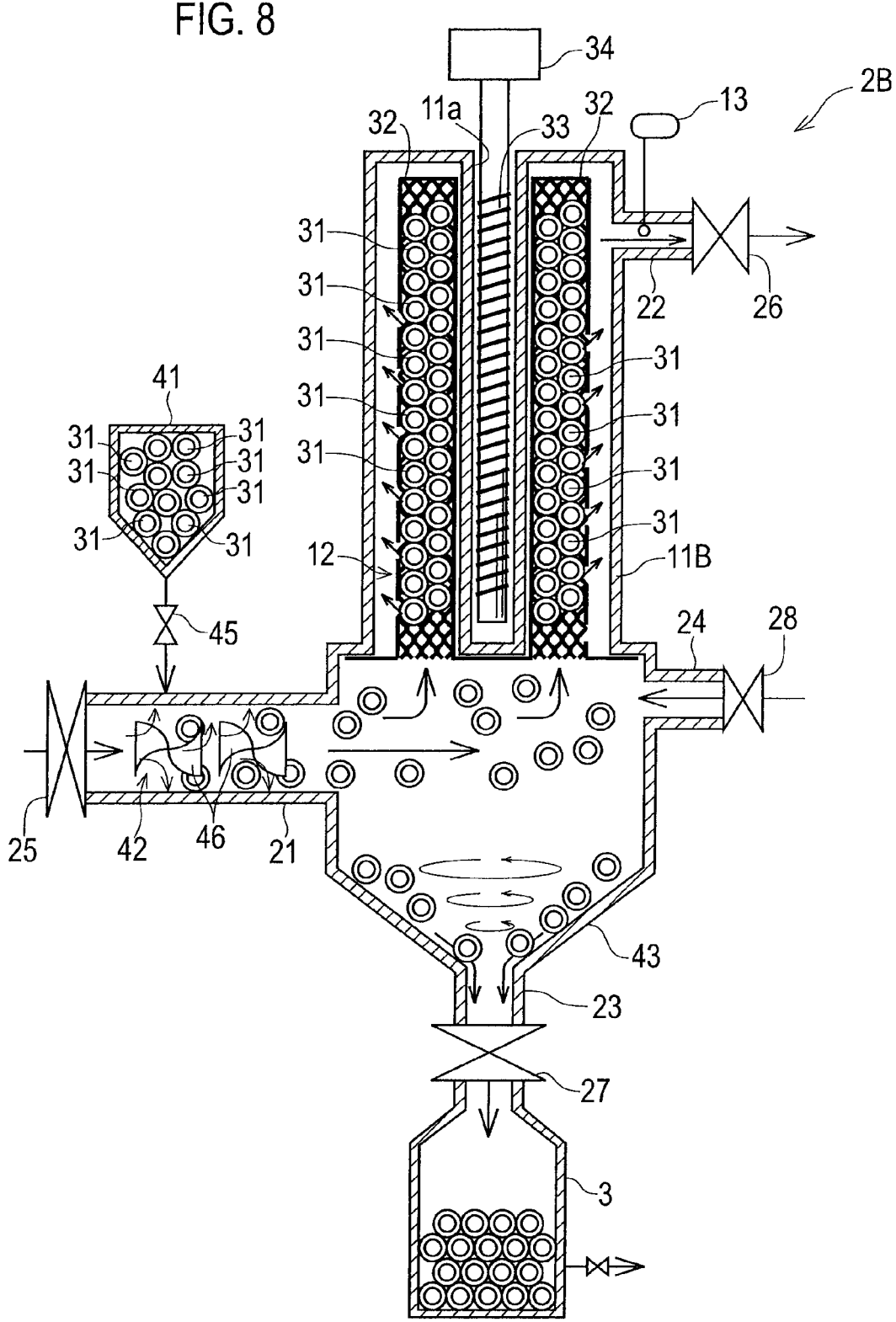
FIG. 8 is an overall cross-sectional view of an oil removal apparatus according to a fourth embodiment.

Next, by referring to the drawing, descriptions will be provided for a fourth embodiment achieved by modifying the oil removal apparatuses according to the foregoing embodiments. FIG. 8 is an overall cross-sectional view of an oil removal apparatus according to the fourth embodiment. The same components as those of the foregoing embodiments will be denoted by the same reference signs, descriptions thereof will be omitted.

As shown in FIG. 8, an oil removal apparatus 2B according to the fourth embodiment includes a main body 11B, the fixed-bed reactor 12, a adsorption particle cartridge (an equivalent of an adsorption particle supplying unit as recited in a claim) 41, a fluidized bed reactor 42 and a cyclone 43.

The adsorption particle cartridge 41 is configured to supply the adsorption particles 31 to the fluidized bed reactor 42 continuously. The adsorption particle cartridge 41 is placed in the water inlet 21 through which the to-be-treated water 51 is supplied to the oil removal apparatus 2B. The adsorption particle cartridge 41 includes a valve 45, the opening and closure of which can be controlled by a controller (whose illustration is omitted). The adsorption particle cartridge 41 is configured to be detachable.

The fluidized bed reactor 42 is placed inside the water inlet 21. The fluidized bed reactor 42 includes elements 46. The fluidized bed reactor 42 agitates the to-be-treated water 51 and the adsorption particles 31 by changing the flow direction of the to-be-treated water 51 by use of these elements 46. Thereby, the fluidized bed reactor 42 increases the efficiency with which the adsorption particles 31 remove the oil 52 from the to-be-treated water 51.

The cyclone 43 is placed in a lower portion of the main body 11B. The cyclone 43 causes the to-be-treated water 51 to flow about a rotational axis which extends in the vertical direction. Thereby, adsorption particles 31 which become heavy as a result of adsorbing the oil 52 included in the to-be-treated water 51 are collected around the external wall of the cyclone 43. Subsequently, the thus-collected adsorption particles 31 are discharged into the adsorption particle container 3. Consequently, the cyclone 43 is capable of discharging the adsorption particles 31 into the adsorption particle container 3 with the concentration of the adsorption particles 31 in the fluid being made higher than otherwise.

In the case of the main body 11B of the fourth embodiment, the effluent port 23 is placed under the cyclone 43.

The oil removal apparatus 2B according to the fourth embodiment treats water in a way that, when being supplied with the to-be-treated water 51, the oil removal apparatus 2B is simultaneously supplied with the adsorption particles 31 whose amount corresponds to the flow rate of the to-be-treated water 51. The supplied adsorption particles 31 and the to-be-treated water 51 are agitated by the fluidized bed reactor 42. Thereby, the oil removal apparatus 2B is capable of increasing the surface coverage with which the adsorption particles 31 adsorb the oil 52. After the adsorption particles 31 adsorb the oil 52, the water content of part of the adsorption particles 31 is reduced by the cyclone 43. Subsequently, the part of the adsorption particles 31 is discharged to the pretreatment apparatus 4. Thereby, the oil removal apparatus 2B is capable of reducing the content of the to-be-treated water 51 in the adsorption particles 31 in the pretreatment apparatus 4. On the other hand, the other part of adsorption particles 31 is held by the holding net 32, and continues adsorbing the oil 52. Like the first embodiment, in the case of an increase in the amount of oil 52 that is measured by the sensor 13, the to-be-treated water 51 is stopped from being supplied, and the adsorption particles 31 having been held by the electromagnet 33 are released.

The oil removal apparatus 2B according to the fourth embodiment has been described by taking an example where only a single adsorption particle cartridge 41 is provided. However, it is to be noted that multiple adsorption particle cartridges 41 may be provided depending on the flow rate of the to-be-treated water 51 and the content of the oil 52 in the to-be-treated water 51. Thereby, the oil removal apparatus 2B is capable of continuing its water treatment operation by using an adsorption particle cartridge 41 while the other adsorption particle cartridge 41 is being replaced with another one.

Furthermore, it is desirable that the oil removal apparatus 2B should reduce load imposed on each of the pretreatment apparatus 4 and the adsorption particle regenerating apparatus 6 by adequately controlling the amount of the adsorption particles 31 to be supplied by use of the valve 45 while measuring the oil 52 by the sensor 13.

Fifth Embodiment

Figure 9:
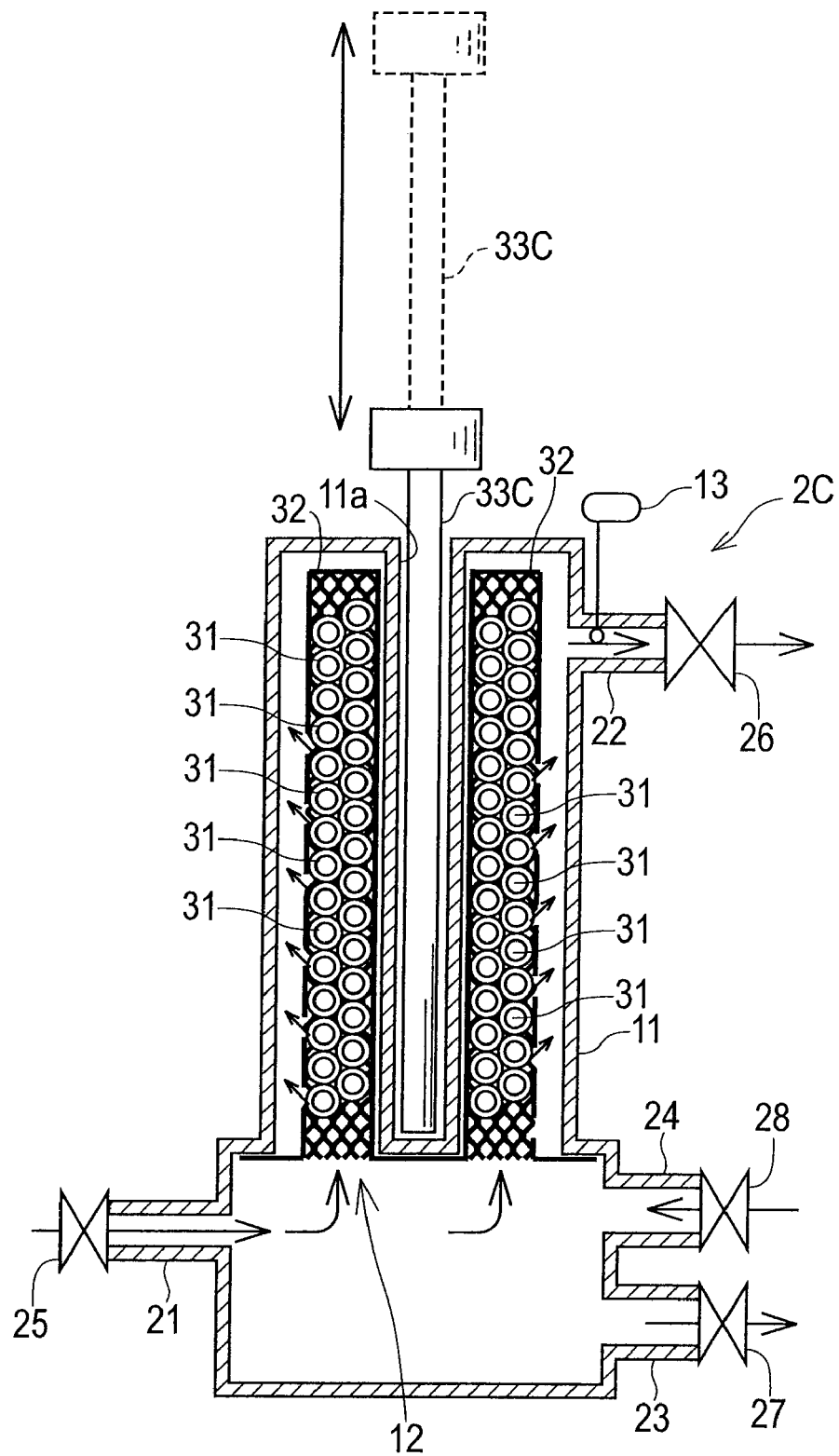
FIG. 9 is an overall cross-sectional view of an oil removal apparatus according to a fifth embodiment.

Next, by referring to the drawing, descriptions will be provided for a fifth embodiment achieved by modifying the oil removal apparatuses according to the foregoing embodiments. FIG. 9 is an overall cross-sectional view of an oil removal apparatus according to the fifth embodiment. The same components as those of the foregoing embodiments will be denoted by the same reference signs, and descriptions thereof will be omitted.

As shown in FIG. 9, an oil removal apparatus 2C according to the fifth embodiment includes a permanent magnet 33C in lieu of the electromagnet. This permanent magnet 33C is configured to be detachably attachable to and from the concave part 11a of the main body 11. For this reason, in treating the to-be-treated water 51, the permanent magnet 33C is inserted into the concave part 11a which allows the permanent magnet 33C to hold the adsorption particles 31 (see an illustration shown in solid lines). On the other hand, when the adsorption particles 31 are to be discharged, the permanent magnet 33C is detached from the concave part 11a to a position which enables the permanent magnet 33C to be discharged the adsorption particles 31 (see an illustration shown in dashed lines).

Sixth Embodiment

Figure 10:
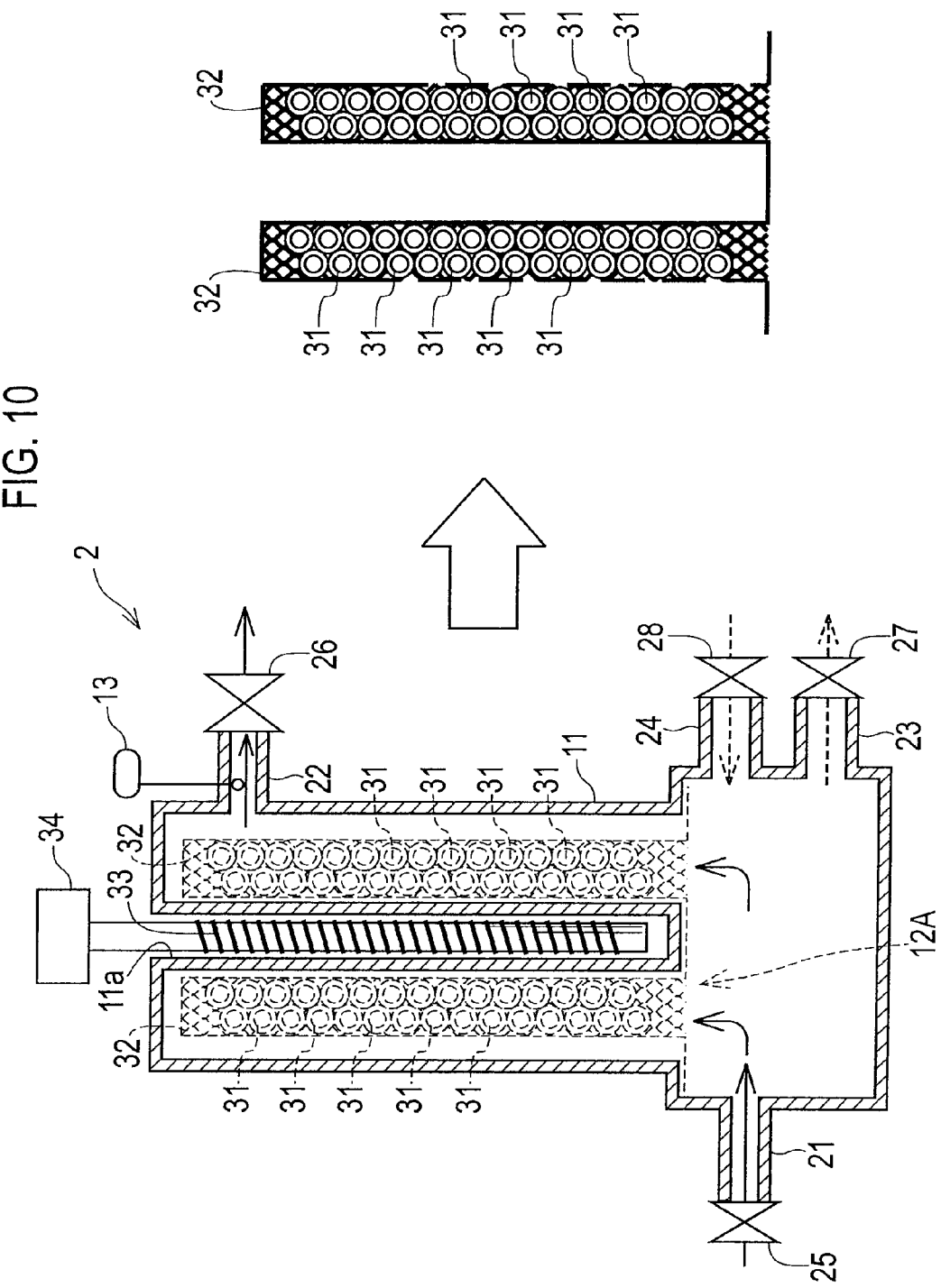
FIG. 10 is an overall cross-sectional view of an oil removal apparatus according to a 6th embodiment.

Next, by referring to the drawing, descriptions will be provided for a 6th embodiment achieved by modifying the oil removal apparatuses according to the foregoing embodiments. FIG. 10 is an overall cross-sectional view of an oil removal apparatus according to the 6th embodiment. The same components as those of the foregoing embodiments will be denoted by the same reference signs, descriptions thereof will be omitted.

As shown in FIG. 10, a fixed-bed reactor 12A according to the 6th embodiment is configured in a way that the holding net 32 is detachable from the fixed-bed reactor 12A. Specifically, after the adsorption of the oil 52, the fixed-bed reactor 12A causes the holding net 32 to be detached from the fixed-bed reactor 12A, and then to be transported to the pretreatment apparatus 4. Note that the water treatment system of the 6th embodiment may include no adsorption particle container 3.

The present invention has been explained in detail by using the embodiments. However, the present invention is not limited to the embodiments explained in this description. The scope of the present invention shall be determined in accordance with the descriptions provided in the scope of claims, and the scope equivalent to the descriptions of the scope of claims. Descriptions will be provided below for modified modes obtained by modifying parts of the foregoing embodiments.

For example, the shapes, numbers, materials and the like in the foregoing embodiments may be changed whenever deemed necessary.

Furthermore, the foregoing embodiments may be combined together partially or wholly.

INDUSTRIAL APPLICABILITY

The present invention is applicable to any water treatment system configured to treat to-be-treated water which includes oil.

REFERENCE SIGNS LIST 1, 1A water treatment system
2, 2a, 2b, 2A, 2B, 2C oil removal apparatus
3 adsorption particle container
4 pretreatment apparatus
5 thermal energy generating apparatus
6 adsorption particle regenerating apparatus
11, 11A, 11B main body
11a concave part
12, 12A fixed-bed reactor
13 sensor
23 effluent port
24 supply port
25, 26, 27, 28, 45 valve
31 adsorption particle
32 holding net
33C permanent magnet
33, 33A electromagnet
34 magnetic force controller
35 base material
36 adsorbent
41 adsorption particle cartridge
42 fluidized bed reactor
43 cyclone
46 element
51 to-be-treated water
52 oil
53 treated water
54 thermal energy
91 to-be-treated water generating facility
92 thermal energy transferring facility

The invention claimed is:

1. A water treatment system comprising:
an oil removal apparatus including a fixed-bed reactor configured to hold adsorption particles by use of a magnetic unit, the adsorption particles each including a base material containing magnetite, the adsorption particles configured to adsorb oil included in to-be-treated water;
a pretreatment apparatus configured to recover the oil from the adsorption particles sent from the oil removal apparatus; and
a thermal energy generating apparatus configured to obtain thermal energy from the oil recovered by the pretreatment apparatus, wherein
the fixed-bed reactor includes:
a main body having a concave part;
a holding net having an annular shape including a closed top, an open bottom, and a permeable outer sidewall;
an electromagnet as the magnet unit which is received in the concave part of the main body;
a water outlet for purified water proximate the top of the main body;
a lower end portion of the main body defining an open chamber adjacently below the open bottom of the holding net;
a water inlet in the lower end portion of the main body opening into the open chamber for supplying the to-be-treated water to the fixed-bed reactor;
a supply port in the lower end of the main body portion opening into the open chamber for supplying regenerated adsorption particles to the fixed-bed reactor; and
an effluent port in the lower end of the main body opening into the open chamber for removing used adsorption particles from the fixed-bed reactor.

2. The water treatment system according to claim 1 further comprising:
an adsorption particle regenerating apparatus configured to regenerate the adsorption particles from which the oil is removed by the pretreatment apparatus.

3. The water treatment system according to claim 2, wherein
the adsorption particle regenerating apparatus supplies the regenerated adsorption particles to the oil removal apparatus.

4. The water treatment system according to claim 1, wherein the pretreatment apparatus is any one of an organic solvent extracting apparatus, a steam cleaning apparatus and a supercritical carbon dioxide extracting apparatus.

5. The water treatment system according to claim 1, wherein
a plurality of the oil removal apparatuses are provided.

6. The water treatment system according to claim 1, wherein
the oil removal apparatus includes:
a measurement unit configured to measure an amount of oil included in the water having been treated for oil removal; and
valves each configured to be opened and closed on the basis of the amount of the oil which is measured by the measurement unit.

7. The water treatment system according to claim 1, wherein
a magnetic force controller configured to electrically control the magnetic unit is provided in order to hold or be discharged the adsorption particles.

8. The water treatment system according to claim 1, wherein
the magnetic unit is a permanent magnet, and
the permanent magnet is movable between a position which enables the permanent magnet to hold the adsorption particles and a position which enables the permanent magnet to be discharged the adsorption particles.

9. The water treatment system according to claim 1 further comprising:
a fluidized bed reactor configured to agitate together the adsorption particles and the to-be-treated water, the fluidized bed reactor provided in an area supplied with the to-be-treated water; and
an adsorption particle supplying unit configured to supply the adsorption particles to the fluidized bed reactor.

10. The water treatment system according to claim 1 further comprising:
a cyclone provided in a lower portion of the oil removal apparatus.

11. The water treatment system according to claim 1, wherein
the holding net has meshes each of which is smaller than each of the adsorption particles.

12. The water treatment system according to claim 1, wherein
the holding net is removable, and
the holding net is removed and transported to the pretreatment apparatus, together with the adsorption particles.

* * * * *